Patented Feb. 1, 1949

2,460,485

UNITED STATES PATENT OFFICE 2,460,485

FLEXIBLE WRINKLE COATED MATERIAL AND METHOD OF PRODUCING SAME

Nathan T. Beynon, Dayton, Ohio, assignor to New Wrinkle, Inc., Wilmington, Del., a corporation of Delaware No Drawing. Original application March 21, 1946, Serial No. 656,173. Divided and this application May 21, 1948, Serial No. 28,530

11 Claims. (Cl. 117—41)

This application is a division of my copending application, Serial No. 656,173, filed March 21, 1946.

This invention relates to wrinkle coated flexible materials and the method of making them.

Hitherto wrinkle drying coating compositions have been of two types: varnish type and alkyd type.

Varnish type wrinkle drying coating compositions consist essentially of a varnish base including a wrinkling oil in admixture with drier and solvent; while alkyd base wrinkle drying coating compositions consist essentially of an alkyd resin in admixture with drier and a solvent.

The production of both varnish base and alkyd base wrinkle drying coating compositions requires cooking of the components at one state or another of the process. The purpose of the present invention is to produce a new type of wrinkle drying coating composition wherein the cooking step is omitted and to utilize such compositions for the manufacture of wrinkle coated flexible materials. In other words, the coating compositions which are to be used according to the present invention are prepared by compounding the component parts thereof without the necessity of cooking.

For this purpose, a wrinkling oil (that is to say, an oil which includes conjugated double bonds in its chemical structure) is admixed with a solution of polyvinyl chloride in solvent in a ratio of from 10 parts to 50 parts of synthetic rubber (dry basis) to 100 parts of wrinkling oil.

The polyvinyl chloride solution may be prepared by dissolving it in any of many solvents suitable therefor or in mixtures thereof. As indicative of solvents useable for the purpose, the following table is given:

| Excellent | Fair to Good | Diluents |
|---|---|---|
| nitromethane | acetone | benzene |
| nitroethane | methyl ethyl ketone | toluene |
| 1-nitropropane | methyl isobutyl ketone | xylene |
| 2-nitropropane | ethyl acetate | other similar aromatic solvents |
| ethylene dichloride | butyl acetate | |
| chloroform | trichloroethylene | naphtha |
| chlorobenzene | beta-trichloroethylene | benzine |
| chlorotoluene | 1,2,3 trichloroethylene | |
| mixed dichloropentanes | dioxane | |
| | dioxolane | |

The most complete and rapid solubility is obtained with solvents in the "Excellent" column; however, solvents in the "Fair to good" column are satisfactory in most instances. Solvents in the "Diluent" column should be employed only to cut or thin solutions of polyvinyl chloride in solvents or mixtures of solvents in the "Excellent" and "Fair to good" columns.

Including nitro aliphatic solvents retards gelling. The chlorinated solvents reduce fire and explosion hazards. The esters and ketones reduce cost and health hazards. The aromatics reduce cost, as do the petroleum hydrocarbons. The following are typical formulas, proportions being by volume:

|   | Per cent |
|---|---|
| 1. Nitrobenzene or nitromethane | 10–30 |
| Naphtha, toluene or xylene | 90–70 |
| 2. Ethylene dichloride | 10–30 |
| Naphtha, toluene or xylene | 90–70 |
| 3. Chlorotoluene or chlorobenzene | 10–30 |
| Naphtha, toluene or xylene | 90–70 |
| 4. Chlorobenzene | 10–30 |
| Methyl ethyl ketone | 90–70 |
| 5. Nitroethane | 10–30 |
| Methyl ethyl ketone | 90–70 |
| 6. Chlorotoluene | 10–30 |
| Diisopropyl ketone | 90–70 |
| 7. Chlorotoluene | 10–20 |
| Nitroethane | 10–20 |
| Naphtha, toluene or xylene | 80–60 |
| 8. Ethylene dichloride | 10–20 |
| Chlorobenzene | 10–20 |
| Methyl ethyl ketone | 80–60 |
| 9. Butyl acetate | 33⅓ |
| Chlorobenzene | 33⅓ |
| Acetone | 33⅓ |
| 10. Ethylene dichloride | 10 |
| Toluene | 10 |
| Benzene | 80 |
| 11. 1-nitropropane | 25 |
| Acetone | 50 |
| Benzene | 25 |

Obviously, many other combinations may be employed successfully for the purpose.

To the resulting mixture may be added, if so desired, from 40 to 80 per cent of a pigment paste comprising for example, two-thirds pigment and one-third wrinkling oil by weight. This pigment paste is thoroughly blended into the mixture of synthetic rubber solution and wrinkling oil to produce a homogeneous composition.

To this homogeneous composition is added a quantity of solvent such as naphtha, toluene, xylene or mixtures thereof, or any other solvent such as customarily employed in varnish formulations, in quantity sufficient to produce a coating of the desired viscosity.

For example, a coating of suitable viscosity for application by spreading may consist of 40 parts by weight of polyvinyl chloride, 100 parts by weight of wrinkling oil, 60 parts by weight of pigment paste, and 10 parts by weight of naphtha.

The use of polyvinyl chloride solutions in admixture with wrinkling oils for producing wrinkle drying coating composition is new in the art; in fact, it has been hitherto considered impossible to use this resin in wrinkle drying coating compositions of any sort because it acted as an inhibitor of wrinkle formation.

Wrinkle patterns or textures hitherto unobtainable may be produced varying the amount of polyvinyl chloride employed in the formulation. In addition, this new type of wrinkle drying coating composition responds to temperature variation during the initial drying or texturing period to such an extent that a great variety of textures or patterns may be obtained.

It is believed that the underlying theory governing the production of wrinkle drying coating composition including polyvinyl chloride is as follows:

The mixture of polyvinyl chloride and wrinkling oil consists of two components which are compatible with each other at the time and under the conditions of mixing and applying; however, during the drying or film-forming period these ingredients separate into distinct phases, and thereby the texture of the wrinkle pattern is altered depending on the relative proportion or ratio of the two component parts. It will be understood, of course, that this theory is offered merely in explanation of observed facts, and that it is not intended thereby to limit this invention.

Polyvinyl chloride may be employed successfully in ratios of from 10 parts to 50 parts to each 100 parts of wrinkling oil, and has been so employed in the practice of this invention.

As has been noted hereinbefore, wrinkling oils are oils which include conjugated double bonds in their chemical structure. They may be native oils such as tung oil and oiticica oil, or they may be modified oils such as dehydrated castor oil (either blown or unblown), blown linseed oil and alkali isomerized oils prepared from normally non-drying oils such as peanut oil and cottonseed oil, or they may be any other type of fatty oil which includes conjugated double bonds in its chemical structure either in the native state or after treatment causing conjugation of isolated double bonds.

It has been found that wrinkle drying compositions made according to the method described above are qualified par excellence for the manufacture of wrinkle coated flexible materials. Thus, paper, fabrics, leather, cork and similar flexible materials may be successfully coated with these uncooked rubber solution-wrinkling oil mixtures, and materials are obtained thereby in which the flexibility has been retained completely or to an unusually high degree.

The compositions may be applied by spraying, spreading and rolling. The resulting film is then dried in an oven or other drying equipment known to those skilled in the art. An initial drying step at 130° F. for 30 minutes and subsequent drying at 180° F. for a period of from 30 to 60 minutes, for example, has been found to give very satisfactory results.

The polyvinyl chloride solution-wrinkling oil coating composition may be applied immediately to the flexible base material. However, intermediary, socalled base coats known to the art, either in one simple layer or in multiple layers, may be applied prior to using the wrinkle coating proper.

It will be understood that while there have been given herein certain specific examples of the practice of this invention, it is not intended thereby to have this invention limited to or circumscribed by the specific details of materials, proportions, or conditions herein specified, in view of the fact that this invention may be modified according to individual preference or conditions without necessarily departing from the spirit of this disclosure and the scope of the appended claim.

I claim:

1. The method of manufacturing flexible, wrinkle-coated materials comprising the steps of mixing at room temperature 100 parts by weight of unsaturated fatty oil with varnish solvent and a solution of from 10 to 50 parts by weight of polyvinyl chloride, applying the mixture thus obtained to a base material, and subjecting the coated material to drying.

2. The method of manufacturing flexible, wrinkle-coated materials comprising the steps of mixing at room temperature 100 parts by weight of unsaturated fatty oil with varnish solvent and a solution of 40 parts by weight of polyvinyl chloride, applying the mixture thus obtained to a base material, and subjecting the coated material to drying.

3. The method of manufacturing flexible, wrinkle-coated materials comprising the steps of mixing at room temperature 100 parts by weight of unsaturated fatty oil with varnish solvent and a solution of from 10 to 50 parts by weight of polyvinyl chloride, admixing pigment paste to the mixture, applying the mixture thus obtained to a base material, and subjecting the coated material to drying.

4. The method of manufacturing flexible, wrinkle-coated materials comprising the steps of mixing at room temperature 100 parts by weight of unsaturated fatty oil with varnish solvent and a solution of from 10 to 50 parts by weight of polyvinyl chloride, admixing pigment paste to the mixture, said pigment paste comprising two-thirds by weight of pigment and one-third by weight of said oil, applying the mixture thus obtained to a base material, and subjecting the coated material to drying.

5. The method of manufacturing flexible, wrinkle-coated materials comprising the steps of mixing at room temperature 100 parts by weight of unsaturated fatty oil with varnish solvent and a solution of from 10 to 50 parts by weight of polyvinyl chloride, admixing 40 to 80 parts by weight of pigment paste to the mixture, applying the mixture thus obtained to a base material, and subjecting the coated material to drying.

6. The method of manufacturing flexible, wrinkle-coated materials comprising the steps of mixing at room temperature 100 parts by weight of unsaturated fatty oil with varnish solvent and a solution of from 10 to 50 parts by weight of polyvinyl chloride, applying the mixture thus obtained to a base material, and subjecting the coated material to drying at substantially 130° F. for approximately 30 minutes and then at substantially 180° F. for a period of from about 30 to 60 minutes.

7. A flexible wrinkle-coated material comprising a flexible base and a coating thereon, said coating comprising 100 parts by weight of unsaturated fatty oil and a solution of from 10 to 50 parts by weight of polyvinyl chloride admixed at room temperature.

8. A flexible, wrinkle-coated material comprising a flexible base and a coating thereon, said coating comprising 100 parts by weight of unsaturated fatty oil and a solution of 40 parts by weight of polyvinyl chloride admixed at room temperature.

9. A flexible, wrinkle-coated material comprising a fixible base and a coating thereon, said coating comprising 100 parts by weight of unsaturated fatty oil, a solution of from 10 to 50 parts by weight of polyvinyl chloride and pigment paste admixed at room temperature.

10. A flexible, wrinkle-coated material comprising a flexible base and a coating thereon, said coating comprising 100 parts by weight of unsaturated fatty oil, a solution of from 10 to 50 parts by weight of polyvinyl chloride and 40 to 80 parts by weight of pigment paste admixed at room temperature.

11. A flexible, wrinkle-coated material comprising a flexible base and a coating thereon, said coating comprising 100 parts by weight of unsaturated fatty oil, a solution of from 10 to 50 parts by weight of polyvinyl chloride and 40 to 80 parts by weight of pigment paste consisting of two-thirds by weight of pigment and one-third by weight of said oil, said ingredients being admixed at room temperature.

NATHAN T. BEYNON.

No references cited.